United States Patent
Hou et al.

(10) Patent No.: US 10,001,897 B2
(45) Date of Patent: Jun. 19, 2018

(54) USER INTERFACE TOOLS FOR EXPLORING DATA VISUALIZATIONS

(75) Inventors: Zhitao Hou, Beijing (CN); Xiao Liang, Beijing (CN); Haidong Zhang, Beijing (CN); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 703 days.

(21) Appl. No.: 13/589,958

(22) Filed: Aug. 20, 2012

(65) Prior Publication Data
US 2014/0049557 A1    Feb. 20, 2014

(51) Int. Cl.
*G09G 5/00*    (2006.01)
*G06F 3/0481*    (2013.01)
*G06F 3/0488*    (2013.01)

(52) U.S. Cl.
CPC ......... *G06F 3/0481* (2013.01); *G06F 3/0488* (2013.01); *G06F 2203/04803* (2013.01); *G06F 2203/04806* (2013.01)

(58) Field of Classification Search
CPC ..... G06F 3/04883; G06F 3/0481; G06T 11/60
USPC ........................................................ 345/629
See application file for complete search history.

(56) References Cited

U.S. PATENT DOCUMENTS

| | | | |
|---|---|---|---|
| 7,149,983 B1 | 12/2006 | Robertson et al. | |
| 7,461,052 B2 | 12/2008 | Dettinger et al. | |
| 7,783,678 B2 | 8/2010 | Kim | |
| 8,326,852 B2 | 12/2012 | Dettinger et al. | |
| 2002/0070953 A1 | 6/2002 | Barg et al. | |
| 2002/0163547 A1 | 11/2002 | Abramson et al. | |
| 2003/0071814 A1 | 4/2003 | Jou et al. | |
| 2004/0056899 A1 | 3/2004 | Sinclair et al. | |
| 2005/0165824 A1 | 7/2005 | Farnham | |
| 2005/0234960 A1 | 10/2005 | Chickering et al. | |
| 2006/0178827 A1 | 8/2006 | Aoyama | |
| 2007/0005562 A1 | 1/2007 | Chau et al. | |
| 2008/0091668 A1 | 4/2008 | Dettinger et al. | |
| 2008/0259041 A1 | 10/2008 | Blumenberg et al. | |
| 2009/0083340 A1 | 3/2009 | Baskaran et al. | |
| 2009/0327975 A1 | 12/2009 | Stedman | |

(Continued)

FOREIGN PATENT DOCUMENTS

| | | |
|---|---|---|
| CN | 1523481 A | 8/2004 |
| EP | 0172368 A2 | 2/1986 |
| EP | 2423797 A1 | 2/2012 |

OTHER PUBLICATIONS

Keim et al., Using Visualization to Support Data Mining of Large Existing Databases, In Proceedings of the IEEE Visualization Workshop on Database Issues for Data Visualization, Oct. 26, 1993, 20 pages.

(Continued)

*Primary Examiner* — Peter Hoang
(74) *Attorney, Agent, or Firm* — Schwegman Lundberg & Woessner, P. A.

(57) ABSTRACT

Data visualizations may include a large number of data points, some of which may be small, and/or data points that are in close proximity to one another. To assist a user in accurately selecting a desired data point, when displaying a data visualization, a magnification area is simultaneously displayed. The magnification area includes a zoomed-in view of a portion of the data visualization, centered at a current location indicated by a selection device. The magnification area also includes centered vertical and horizontal crosshairs to visually indicate the current location indicated by the selection device.

18 Claims, 6 Drawing Sheets

(56) References Cited

U.S. PATENT DOCUMENTS

| | | |
|---|---|---|
| 2010/0010980 A1 | 1/2010 | Dettinger et al. |
| 2010/0050076 A1 | 2/2010 | Roth |
| 2010/0079498 A1 | 4/2010 | Zaman et al. |
| 2010/0156804 A1 | 6/2010 | Young |
| 2010/0162146 A1 | 6/2010 | Winkler et al. |
| 2010/0214299 A1 | 8/2010 | Robertson et al. |
| 2010/0235771 A1 | 9/2010 | Gregg, III |
| 2010/0257447 A1 | 10/2010 | Kim et al. |
| 2010/0265200 A1 | 10/2010 | Cho et al. |
| 2010/0325166 A1 | 12/2010 | Rubin |
| 2011/0012856 A1 | 1/2011 | Maxwell et al. |
| 2011/0012931 A1 | 1/2011 | Abe |
| 2011/0115814 A1 | 5/2011 | Heimendinger et al. |
| 2011/0164060 A1 | 7/2011 | Miyazawa et al. |
| 2011/0178974 A1 | 7/2011 | Sayal et al. |
| 2011/0225525 A1 | 9/2011 | Chasman et al. |
| 2011/0283231 A1 | 11/2011 | Richstein et al. |
| 2011/0289161 A1 | 11/2011 | Rankin, Jr. et al. |
| 2012/0030566 A1 | 2/2012 | Victor |
| 2012/0054226 A1 | 3/2012 | Cao et al. |
| 2012/0166470 A1 | 6/2012 | Baumgaertel et al. |
| 2013/0044114 A1 | 2/2013 | Burtner et al. |
| 2013/0151572 A1 | 6/2013 | Brocato et al. |
| 2013/0185624 A1 | 7/2013 | Appleyard et al. |
| 2014/0053091 A1 | 2/2014 | Hou et al. |

OTHER PUBLICATIONS

Song, et al., "WYSIWYF: Exploring and Annotating Volume Data with a Tangible Handheld Device", In Proceedings of the Annual Conference on Human Factors in Computing Systems, May 7, 2011, pp. 1333-1342.

"MagicalPad Take Control of Your Notes", Retrieved on: Mar. 27, 2012, Available at: http://www.magicalpad.com/wp-content/uploads/2011/10/MagicalPad-User-Manual.pdf 34 pages.

"International Search Report & Written Opinion for PCT Patent Application No. PCT/US2013/054809", dated Nov. 13, 2013, Filed Date: August 13, 2013, 19 Pages.

"GeogXpert for Ipad", Published on: August 29, 2011, Available at: http://www.alancsmith.co.uk/geogxpertipad/GeogXpertIPad_1.html Bailey, et al., "From Records to Data with Viewshare: an Argument, an Interface, a Design", In Proceedings of Bulletin of the American Society for Information Science & Technology, vol. 38 Issue 4, Apr. 2012, 4 pages.

Heer, Jeffrey Michael, Supporting Asynchronous Collaboration for Interactive Visualization, In Proceedings of the Dissertation, Dec. 17, 2008, 209 pages.

Interactive Analysis for Business Information and Insights, In Proceedings of the White Paper, Jul. 19, 2012, 4 pages.

Office Action for U.S. Appl. No. 13/589,999, dated Jul. 17, 2014, Zhitao Hou, "Data Exploration User Interface", 20 pages.

Reports Tour—Charting, Retrieved on: Sep. 27, 2013, Available at: http://www.zoho.com/reports/Charting-Data.html.

Tour the Complete Business Data Environment, Published on: Oct. 3, 2012, Available at: http://chartio.com/product/tour.

"First Office Action Issued in European Patent Application No. 13753943.3", dated Oct. 29, 2015, 13 Pages.

"Office Action Issued in European Application No. 13753943.3", dated Jun. 28, 2016, 8 Pages.

"Office Action Issued in European Patent Application No. 13753943.3", dated Jul. 31, 2017, 7 Pages.

"First Office Action and Search Report Issued in Chinese Patent Application No. 201380044078.7", dated Feb. 14, 2017, 13 Pages.

"Second Office Action Issued in Chinese Patent Application No. 201380044078.7", dated Jul. 19, 2017, 10 Pages.

"Third Office Action Issued in Chinese Patent Application No. 201380044078.7", dated Dec. 5, 2017, 10 Pages.

USER INTERFACE TOOLS FOR EXPLORING DATA VISUALIZATIONS

BACKGROUND

Data visualizations enable users to view graphical representations of data relationships. Data visualization formats include, by way of example, bar charts, line graphs, pie graphs, bubble graphs, and any other format in which data can be graphically represented. Many applications for rendering data visualizations also provide for user interaction with the data through a displayed visualization. For example, a user may select a particular slice of a pie chart to drill down to see more details regarding the data represented by the selected slice. For data visualizations representing large data sets and/or for display devices with small screens, precise selection of particular data points can be challenging.

SUMMARY

This document describes user interface tools for exploring data visualizations. When a data visualization is displayed, a user may use a selection device (e.g., a mouse, a stylus, a finger, etc.) to indicate a current location within the display. To assist the user in making an accurate selection, a magnification area is displayed simultaneously with the data visualization. The magnification area includes a zoomed-in view of an area of the data visualization, centered at the current location indicated by the selection device. The magnification area also includes vertical and horizontal crosshairs that intersect in the center of the magnification area to further assist the user in identifying the exact location that is currently indicated by the selection device.

If the current location indicated by the selection device happens to coincide with a particular data point within the data visualization, the magnification area may also include a details box that includes additional information associated with the particular data point.

The location at which the magnification area is displayed may be determined dynamically based at least in part on the current location and a display threshold that divides the display into at least two portions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Data visualizations provide users with graphical views of data sets. Such data visualizations are also often interactive, allowing a user to drill-down to view additional or more detailed information by selecting a particular item within a data visualization. For example, if data is illustrated in a pie chart, a user may select a particular slice of the pie chart to view more details associated with the data represented by the particular slice. Similarly, a specific bar may be selected if data is represented as a bar chart; a specific bubble may be selected if data is represented as a bubble chart; a specific line may be selected if data is represented as a line chart, and so on.

A data visualization may be displayed such that selectable portions of the data visualization may be very small or may be displayed in close proximity to other portions of the data visualization, making accurate selection of a particular portion difficult. For example, a bubble graph may include any number of overlapping bubbles, making selection of a bubble that is displayed mostly behind another bubble difficult. Furthermore, data visualizations displayed on small and/or touch screen displays may pose additional selection challenges. For example, on a small screen, a data visualization may be visually compressed, making distinctions between various selectable portions of the data visualization much smaller than if displayed on a large screen. As another example, if using a touch screen, the size of a user's finger or other selection device may hinder the user's ability to accurately select a small portion of a data visualization.

Zoom operations may be implemented, which allow a user to zoom in on a particular area of a data visualization. However, if a data visualization is zoomed in sufficiently for a user to accurately select a particular data point, the overall view of the data visualization may be lost. In other words, when zoomed in closely on a particular portion of a data visualization, the context of that particular portion within the data visualization as a whole may be lost.

The user interface tools for exploring data visualizations described herein provide for a magnification area that is displayed simultaneously with an overall view of a data visualization. The magnification are provides a zoomed-in view of a particular portion of the data visualization, while the overall view of the data visualization provides contextual information to enable the user to see where the particular portion of the data visualization that is shown in the magnification area appears within the overall data visualization.

Example User Interface

Figure 1:
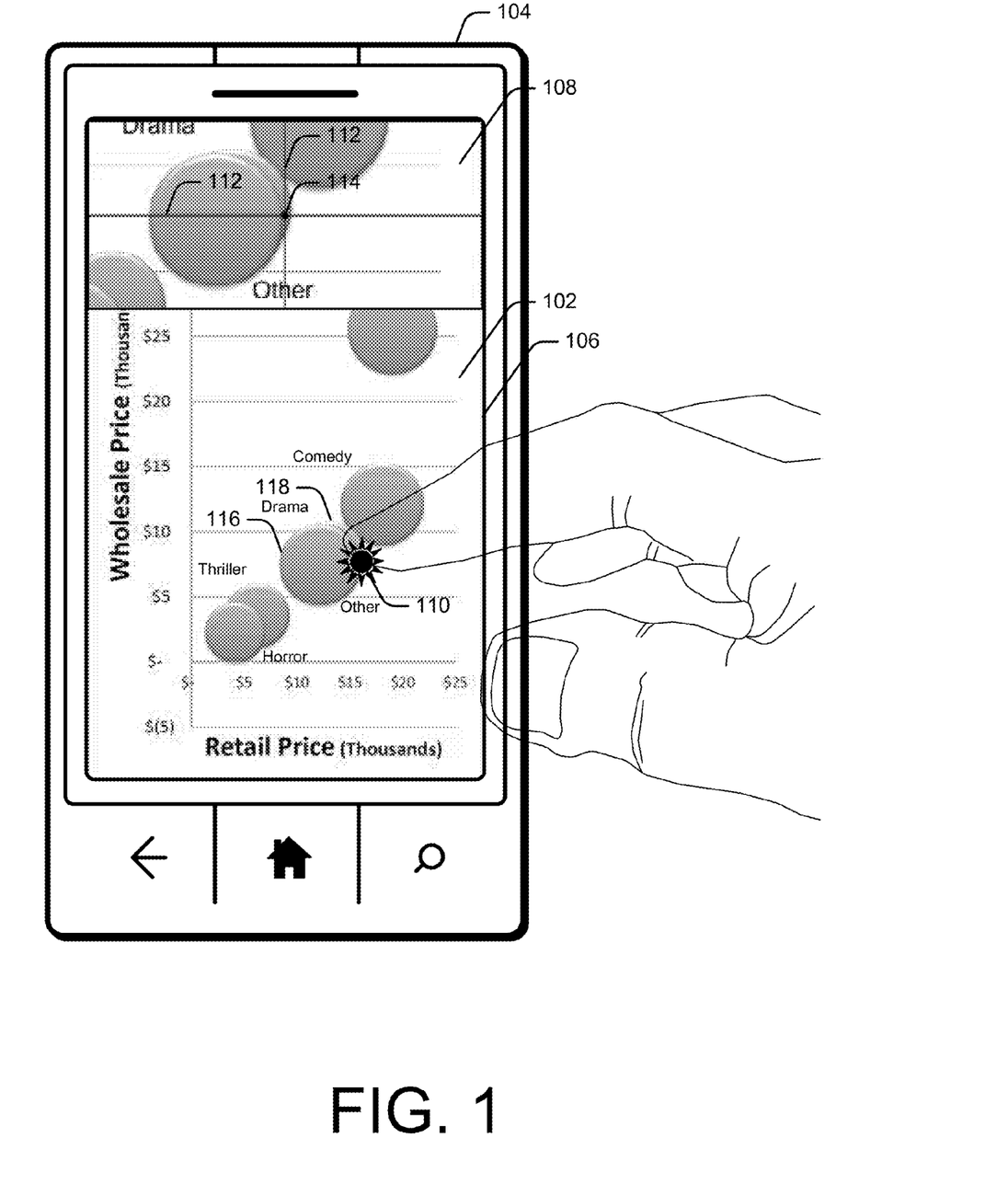
FIG. 1 is a pictorial diagram of an example user interface tool for enabling precise selection within a data visualization.
Figure 2:
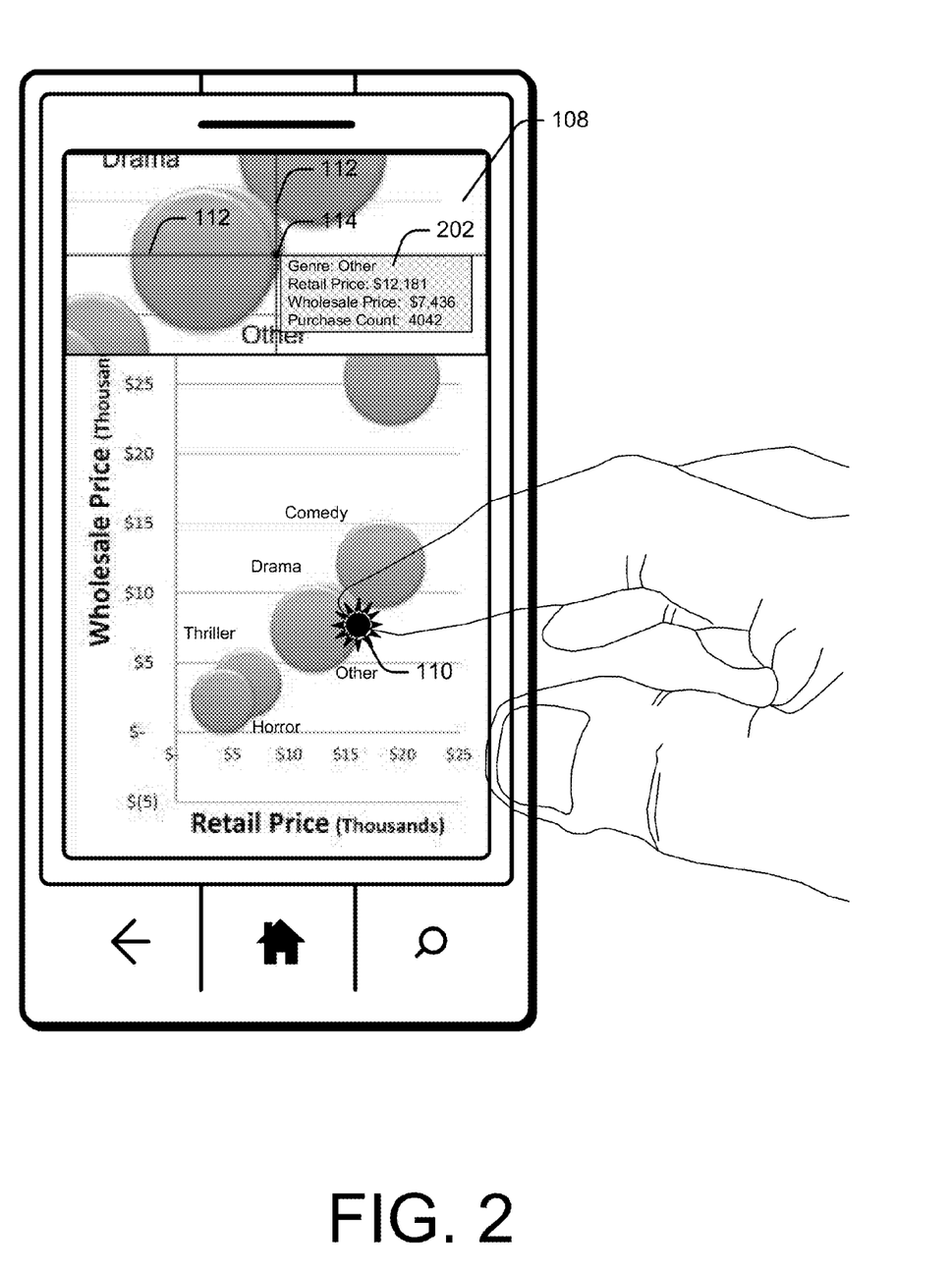
FIG. 2 is a pictorial diagram of an example user interface tool for displaying details associated with a current data point within a data visualization.
Figure 3:
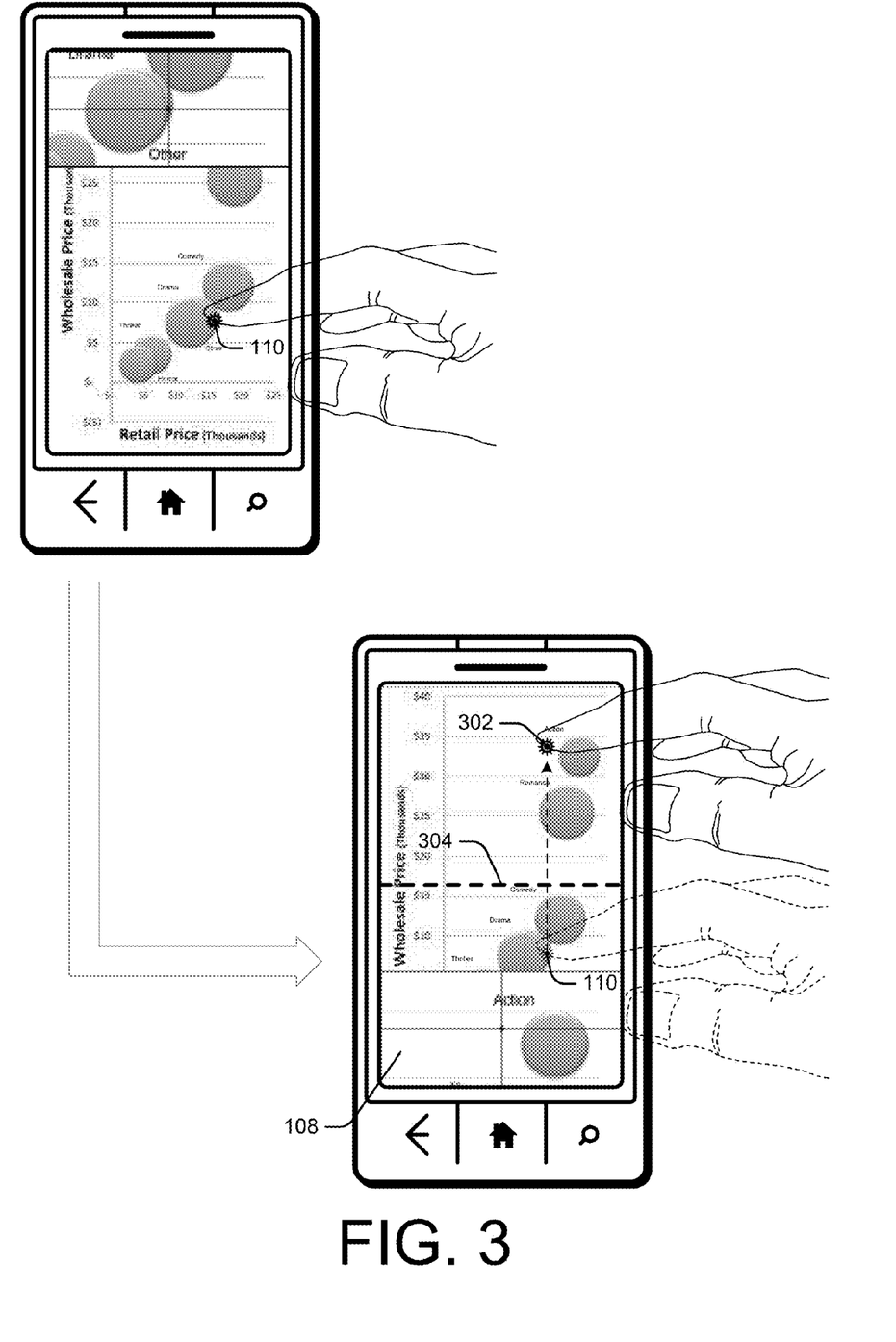
FIG. 3 is a pictorial diagram of an example display transition according to a user interface tool for exploring data visualizations.

FIGS. 1-3 illustrate example user interface displays that may be rendered using the user interface tools for exploring data visualizations described herein. Although FIGS. 1-3 each illustrate a mobile device with a small touch screen display, the same user interface tools may also be implemented for use with a larger display and/or a non-touch display in conjunction with a mobile or non-mobile computing device.

FIG. 1 illustrates an example user interface tool for enabling precise selection within a data visualization. FIG. 1 illustrates an example in which a bubble graph (data visualization) 102 is displayed on a mobile device 104 with a small touch screen display 106.

As illustrated in FIG. 1, when the user touches the screen over the bubble graph 102, magnification area 108 is displayed at the top of the screen. Magnification area 108 displays an enlarged view of the area directly surrounding the location 110 that is currently being touched by the user. Magnification area 108 also includes crosshairs 112, which are centered over location 114, which corresponds to the location 110 that is currently being touched by the user.

The magnified view, aided by the crosshairs, enables a user to finely adjust the position that they are touching to accurately select a particular data point. For example, as shown in FIG. 1, the bubble graph 102 includes several bubbles, including one representing "Drama" 116 and one representing "Other" 118. The "Drama" bubble 116 significantly overlaps the "Other" bubble 118, making it difficult for a user to accurately select the "Other" bubble 118 with their finger via the touch screen. However, when the magnification area 108 is displayed with the crosshairs 112, the user is able to easily see the exact location 114 they are currently touching and that would thus be selected if the user were to lift their finger.

FIG. 2 illustrates an example user interface tool for displaying details associated with a current data point within a data visualization. As described above with reference to FIG. 1, magnification area 108 includes crosshairs 112, which indicate a specific location 114 that corresponds to the location 110 that is currently being touched. In the example illustrated in FIG. 2, when the current location being touched 110 is on a particular data point, details box 202 is displayed in magnification area 108. Details box 202 provides additional information associated with the particular data point corresponding to the current location. The details box 202 may display any data associated with the particular data point, including a name or other designator of the data point and/or specific values associated with the data point.

As described above, in many data visualization implementations, selection of a particular data point allows the user to drill down to more detailed information about the particular data point. This typically includes a new screen display to show the more detailed information. In the example illustrated in FIG. 2, the details box 202 may display at least some of the more detailed information that may be displayed if the user selects the particular data point, thereby providing at least a portion of the drill-down information to the user without having to render a new display screen. In an example implementation, if there user chooses, they may still select the particular data point to perform a drill down operation that may, for example, result in a new screen display of the more detailed information.

Additionally, details box 202 provides additional assistance to the user in accurately selecting a particular data point. For example, in the illustrated example display, the "Drama" bubble significantly overlaps the "Other" bubble such that, even in the magnification area 108, it may be difficult for the user to discern which bubble will be selected if the user releases their finger. The details box 202 provides the user an additional indicator of which particular data point they are currently touching.

FIG. 3 illustrates an example display transition according to a user interface tool for exploring data visualizations. As shown in FIG. 3, the display location of magnification area 108 depends on the location that is currently being touched by the user. For example, if the user touches location 110, magnification area 108 is displayed at the top of the screen, as shown in the upper left portion of FIG. 3. As shown in the lower right portion of FIG. 3, if the user then moves their finger (or other selection device) up to location 302, magnification area 108 is then displayed at the bottom of the screen.

In the illustrated example, the display location of magnification area 108 is based on a comparison between the location that is currently being touched by the user (110 or 302) and a vertical display threshold 304, such that if the current location being touched is below the vertical display threshold 304, the magnification area 108 is displayed at the top of the screen (on the opposite side of the vertical display threshold), and if the current location being touched is above the vertical display threshold 304, the magnification area 108 is displayed at the bottom of the screen (on the opposite side of the vertical display threshold). In various implementations, the location and/or orientation of the display threshold may vary. For example, the display threshold may be located closer to the top or bottom of the screen, or may be a vertical line that separates the right from left and the magnification area may be displayed along the right or left edge of the screen.

Example Computing Device

Figure 4:
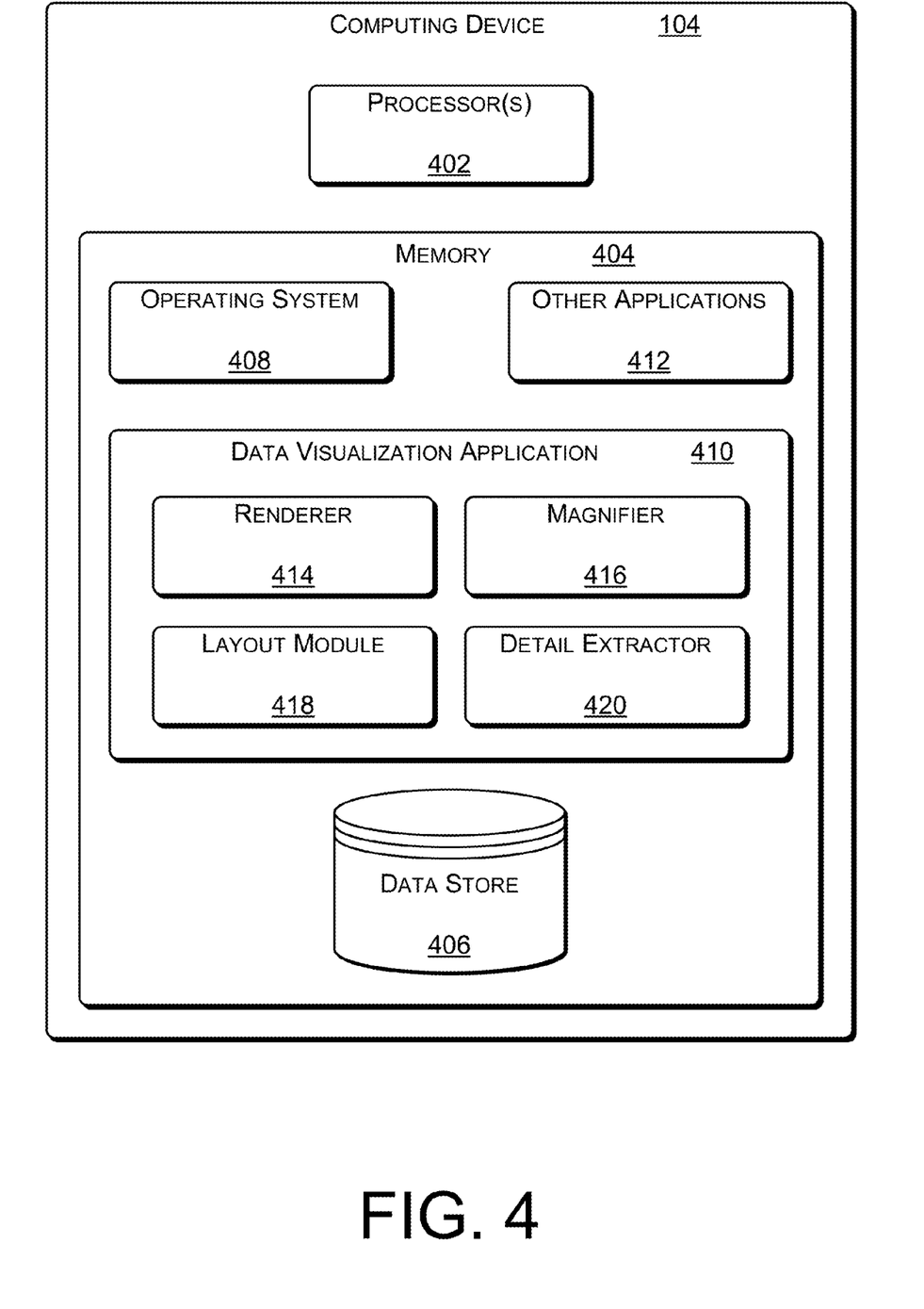
FIG. 4 is a block diagram that illustrates components of an example computing device configured to implement user interface tools for enabling precise selection within a data visualization.

FIG. 4 illustrates components of an example computing device 104. As described above, computing device 104 represents any type of computing device configured to display interactive data visualizations, and may include devices with an integrated or communicatively connected display. Furthermore, the display associated with computing device 104 may be of any size and may be a touch screen or non-touch screen.

Example computing device 104 includes one or more processors 402, memory 404, and data store 406. Data store 406 maintains data to support the display of interactive data visualizations.

An operating system 408, a data visualization application 410, and one or more other applications 412 are stored in memory 404 as computer-readable instructions, and are executed, at least in part, on processor 402.

Data visualization application 410 includes a renderer 414, a magnifier 416, a layout module 418, and a detail extractor 420. Renderer 414 is configured to extract requested data from data store 406 and create a data visualization of the requested data.

Magnifier 416 is configured to determine a specific location that is currently being touched (or otherwise indicated with a selection device) and to render a zoomed-in view of a portion of the rendered data visualization, centered at the specific location that is currently being touched. As an example, if the data visualization is rendered at a 100% magnification scale, the portion of the rendered data visualization, centered at the current location associated with the selection device may be rendered at a 200% magnification scale. In an example implementation, the magnification scale used by magnifier 416 may be pre-determined. In an alternate implementation, the magnification scale used by magnifier 416 may be user-configurable and/or dynamically determined. For example, a default or predefined zoom scale may be used to render magnification area 108. In an example implementation, if the default zoom scale is not sufficient for a user's needs, the user may modify the zoom scale using, for example, a zoom-in/zoom-out button and/or a pinch-to-zoom gesture.

Layout module 418 is configured to determine a display location for the magnification area. In an example implementation, the location at which the magnification area is to be displayed is determined based on a comparison between a location associated with a selection device and a display threshold location. For example, if the display threshold is a horizontal line separating the top portion of the screen from the bottom portion of the screen, then layout module 418 determines whether the location associated with the selection device is above or below the display threshold, and positions the display of the magnification area in the opposite portion of the screen.

Detail extractor 420 is configured to extract additional details from data store 406 when the current location associated with the selection device coincides with a data point in the data visualization. For example, as illustrated in FIG. 2, when the current location 110 is over the "Other" data point, additional information regarding the "Other" data point is extracted from data store 406 and displayed in details box 202.

Although illustrated in FIG. 4 as being stored in memory 404 of computing device 104, data visualization application 410 and/or data store 406, or portions thereof, may be implemented using any form of computer-readable media that is accessible by computing device 104 either locally or remotely, including over a network. Furthermore, in alternate implementations, one or more components of operating system 408, data visualization application 410, and other applications 412 may be implemented as part of an integrated circuit that is part of, or accessible to, computing device 104.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

Figure 5:
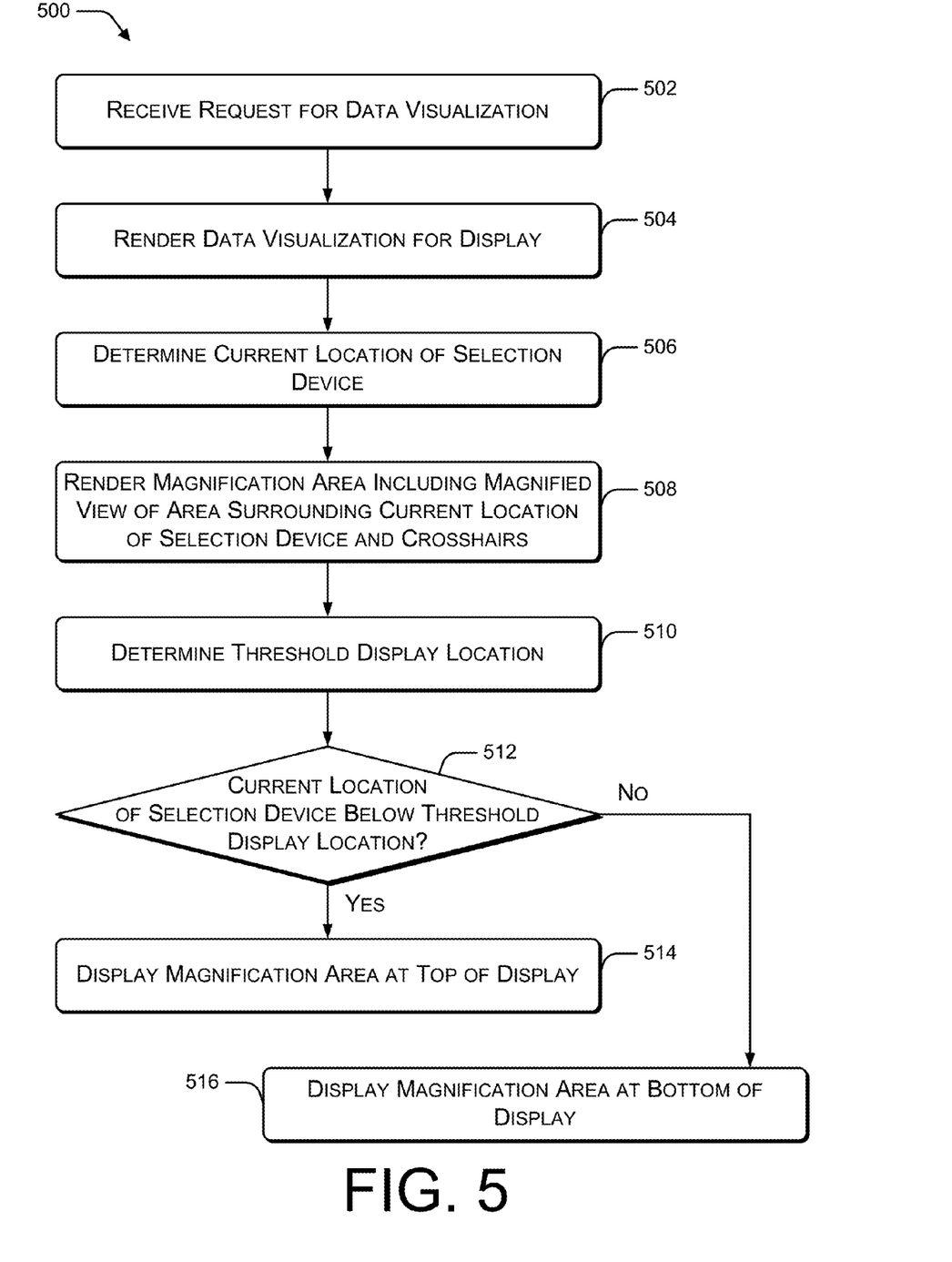
FIG. 5 is a flow diagram of an example process for providing a magnification area in conjunction with a displayed data visualization.
Figure 6:
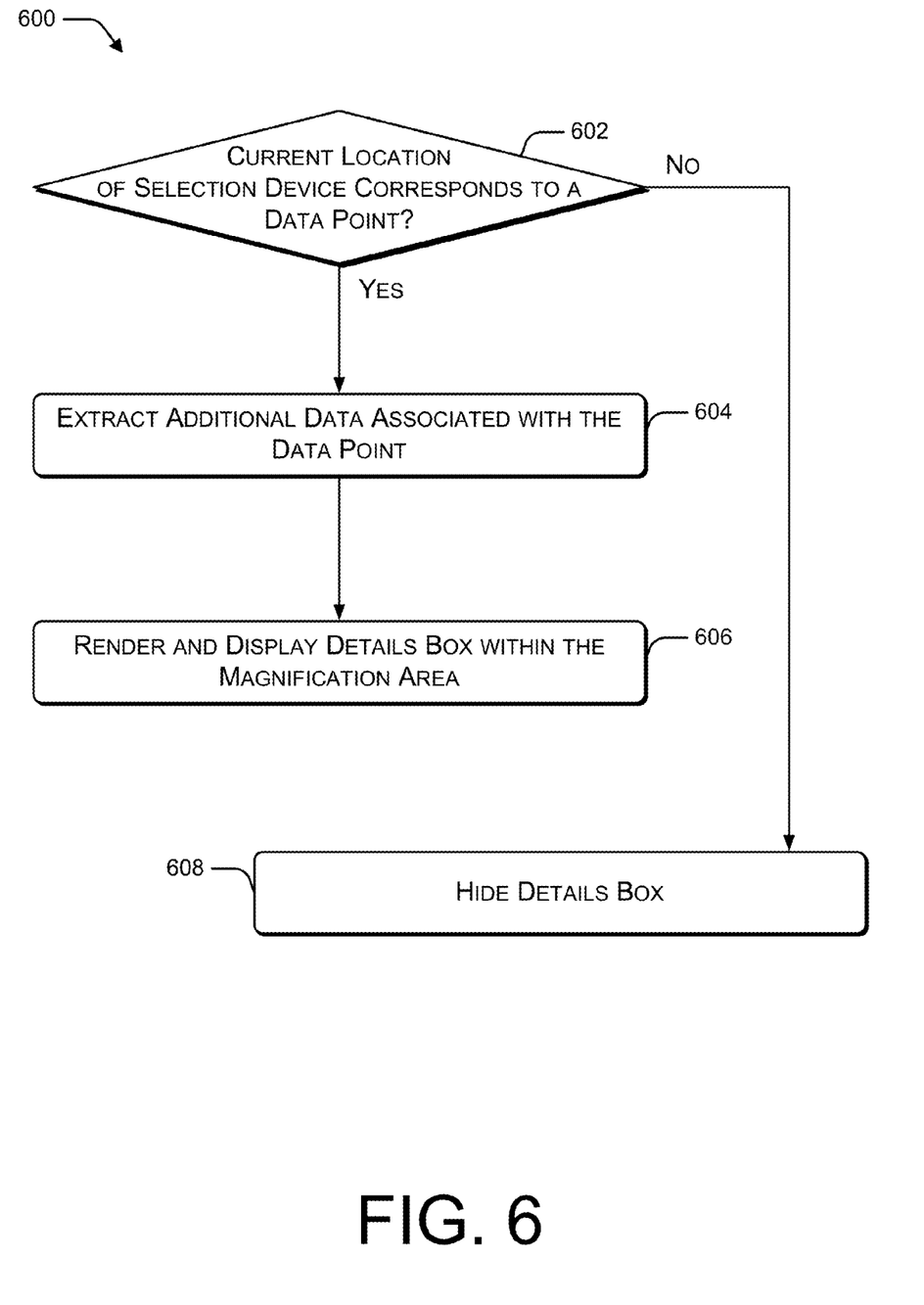
FIG. 6 is a flow diagram that illustrates an example process for providing a details box within a magnification area in conjunction with a displayed data visualization.

FIGS. 5 and 6 illustrate example processes 500 and 600 for providing user interface tools for exploring data visualizations as described herein. These processes are illustrated as collections of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the illustrated processes, or alternate processes. Additionally, individual blocks may be deleted from the processes without departing from the spirit and scope of the subject matter described herein. Furthermore, while these processes are described with reference to the computing device 104 described above with reference to FIG. 4, other computer architectures may implement one or more portions of these processes, in whole or in part.

FIG. 5 illustrates an example process 500 for providing a magnification area in conjunction with a displayed data visualization.

At block 502, a request for a data visualization is received. For example, data visualization application 410 may receive a user-submitted request for a particular data visualization.

At block 504, the requested data visualization is rendered for display. For example, renderer 414 extracts the requested data from data store 406 and creates the requested data visualization. The data visualization is then displayed using a display screen associated with computing device 104.

At block 506, a current location associated with a selection device is determined. For example, in a touch screen environment, magnifier 416 determines a specific location that corresponds to a user's touch on the touch screen. In a non-touch screen environment, magnifier 416 determines a specific location based on another type of selection device such as, for example, a mouse or stylus.

At block 508, a magnification area including a magnified view of an area surrounding the current location associated with the selection device is rendered with crosshairs. For example, magnifier 416 renders a zoomed-in view of a portion of the rendered data visualization, centered at the current location associated with the selection device.

At block 510, a threshold display location is determined. For example, as illustrated in FIG. 3, the threshold display location may be a midpoint between the top and bottom of the screen.

At block 512, a comparison of the current location associated with the selection device and the threshold display location is made. For example, layout module 418 compares the current location associated with the selection device and the threshold display location to determine if the current location is above or below the threshold display location. If the current location associated with the selection device is below the threshold display location (the "Yes" branch from block 512), then at block 514, the magnification area is displayed at the top of the display.

On the other hand, if the current location associated with the selection device is above the threshold display location (the "No" branch from block 512), then at block 516, the magnification area is displayed at the bottom of the display.

FIG. 6 illustrates an example process 600 for providing a details box within a magnification area in conjunction with a displayed data visualization.

At block 602, a determination is made regarding whether or not the current location associated with a selection device corresponds to a data point within a displayed data visualization. For example, as illustrated in FIG. 2, the current location 110 of the user's finger corresponds to the data point representing the genre "Other." Conversely, as illustrated in FIG. 3, the current location 302 of the user's finger does not correspond to a data point within the displayed data visualization.

If it is determined that the current location associated with the selection device corresponds to a data point (the "Yes" branch from block 602), then at block 604, additional data associated with the data point is extracted, and at block 606, a details box containing the additional data is rendered and displayed within the magnification area. For example, detail extractor 420 extracts additional data from data store 406 and layout module 418 causes the details box to be displayed within the magnification area.

On the other hand, if it is determined that the current location associated with the selection device does not correspond to a data point (the "No" branch from block 602), then at block 608, any currently displayed details box is hidden. For example, layout module 418 removes the details box from the current display.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
rendering a data visualization on an electronic display, wherein the data visualization comprises a graph or a chart of objects that represent respective selectable data points;
determining, within the electronic display, a current location associated with a selection device;
rendering, on the electronic display, a magnification area overlaying a portion of the data visualization, the magnification area including:
an enlarged view of an area of the data visualization centered around the current location associated with the selection device;
vertical and horizontal crosshairs that overlay the enlarged view of the area of the data visualization centered around the current location associated with the selection device, the vertical and horizontal crosshairs being centered such that an intersection of the vertical crosshair and the horizontal crosshair corresponds with the current location associated with the selection device; and
in an event that the current location associated with the selection device is associated with a particular data point of the selectable data points, a details box displaying details associated with the particular data point, the details box including different information regarding the particular data point than what is displayed in the data visualization, wherein the details box includes data identifying an object of the objects to which the particular data point belongs.

2. A method as recited in claim 1, wherein the selection device is a computer mouse.

3. A method as recited in claim 1, wherein the selection device is a user's finger.

4. A method as recited in claim 1, wherein rendering the magnification area overlaying the data visualization comprises determining a display location for the magnification area based on the current location associated with the selection device.

5. A method as recited in claim 1, wherein rendering the magnification area overlaying the data visualization comprises:
determining a vertical display threshold of the electronic display;
comparing the current location associated with the selection device to the vertical display threshold of the electronic display;
in an event that the current location associated with the selection device is below the vertical display threshold of the electronic display, rendering the magnification area overlaying a top portion of the data visualization; and
in an event that the current location associated with the selection device is above the vertical display threshold of the electronic display, rendering the magnification area overlaying a bottom portion of the data visualization.

6. A method as recited in claim 5, wherein the electronic display is a touch screen display device.

7. One or more computer storage media encoded with computer-executable instructions that, when executed, configure a computer system to perform a method as recited in claim 1.

8. A method as recited in claim 1, further comprising:
in response to detecting release of the selection device, rendering a second data visualization on the electronic display, wherein the second data visualization comprises the data represented by the object.

9. A user interface rendered on an electronic display, the user interface comprising:
an interactive data visualization comprising a chart or a graph chart of objects that represent respective selectable data points, displayed in a first portion of the electronic display;
a magnification area displayed in a second portion of the electronic display, the magnification area including vertically and horizontally centered crosshairs to display a magnified view of an area of the interactive data visualization that is centered around a location associated with a selection device; and
in an event that the current location associated with the selection device is associated with a particular data point of the selectable data points, a details box displaying details associated with the particular data point, the details box including different information regarding the particular data point than what is displayed in the data visualization, wherein the details box includes data identifying an object of the objects to which the particular data point belongs.

10. A user interface as recited in claim 9, wherein:
when the location associated with the selection device does not correspond with any of the plurality of selectable data points, the details box is not displayed.

11. A user interface as recited in claim 9, wherein the magnification area is displayed on an opposite side of a display threshold from the location associated with the selection device.

12. A user interface as recited in claim 9, further comprising:
in response to detecting release of the selection device, a second data visualization, wherein the second data visualization comprises the data represented by the object.

13. A system comprising:
a processor;
a memory communicatively coupled to the processor; and
a data visualization application at least partially stored in the memory and executable on the processor, to render a data visualization from a data store; wherein the data visualization comprises a chart or a graph of objects that represent respective selectable data points, the data visualization application including:

a renderer to:
- extract data from the data store;
- generate the chart or graph based on the data that is extracted; and
- render the chart or graph as the data visualization for display;

a magnifier to:
- determine a specific location that is currently being indicated with a selection device; and
- render a magnification area over a portion of the data visualization;

a layout module to:
- determine a display location for the magnification area based on the specific location and a location of a display threshold; and
- determine whether the specific location corresponds to a selectable data point of the selectable data points; and the magnification area including:
- a zoomed-in view of a portion of the rendered data visualization, the portion being centered around the specific location;
- vertical and horizontal crosshairs centered in the magnification area; and
- in an event that the current location associated with the selection device is associated with a particular data point of the selectable data points, a details box displaying details associated with the particular data point; and a detail extractor to:
- extract additional details from the data store, the additional details associated with the selectable data point including different information regarding the selectable data point than what is displayed in the data visualization, wherein the different information includes data identifying an object of the objects to which the particular data point belongs; and the details box further includes the extracted additional details from the data store.

14. A system as recited in claim 13, wherein the display threshold divides a display area into a first portion and a second portion.

15. A system as recited in claim 14, wherein the layout module is configured to determine the display location for the magnification area such that:
- when the specific location is within the first portion of the display, the magnification area is displayed in the second portion of the display; and
- when the specific location is within the second portion of the display, the magnification area is displayed in the first portion of the display.

16. A system as recited in claim 13, further comprising a display screen on which to display the data visualization.

17. A system as recited in claim 16, wherein the display screen is a touch screen.

18. A system as recited in claim 13, wherein the magnifier is further to, in response to detecting release of the selection device, render, in place of the data visualization, a second data visualization, wherein the second data visualization comprises the data represented by the object.

* * * * *